Patented Dec. 29, 1953

2,664,381

UNITED STATES PATENT OFFICE 2,664,381

PARASITICIDAL LOTION

Allen L. Omohundro, Wilton, and Franz M. Neumeier, Fairfield, Conn., assignors to McKesson & Robbins, Incorporated, Bridgeport, Conn., a corporation of Maryland No Drawing. Application June 2, 1953,
Serial No. 359,228

4 Claims. (Cl. 167—58)

The present invention relates to parasiticidal lotions for combating such body parasites as head and body lice, and the present application is a continuation-in-part of copending application Serial No. 774,894, filed September 18, 1947.

Among the objects of the present invention is to produce a lotion which is quickly effective as a parasiticide, which is clear, homogeneous and stable, which manifests no adverse skin reaction, which is easy to apply and easy to remove, which is free from grease and which in general lends itself satisfactorily to the strictest pharmaceutical requirements.

In accordance with certain features of the present invention, the lotion comprises an aqueous suspension made of a pyrethrum extract as an active parasiticidal ingredient, a sesamin extract having a synergistic or activating action on the pyrethrins of the pyrethrum extract, apiol having insecticidal effect, dinitroanisole serving as an ovicide and benzyl alcohol which is a solvent for the ovicide and which affords an anaesthetic effect. The mixture may also contain perfume oils.

The different ingredients of the lotion described above are dispersed in a diluent and specifically water. The resulting mixture is not clear or stable, since it comprises a large number of immiscible liquids and since the pyrethrum extract usually contains fat and wax. It has been found in accordance with the present invention that the mixture of all of these ingredients including the water can be made easily emulsifiable by an intermiscible solvent. An intermiscible solvent is a material in which two or more non-miscible substances can be dissolved to yield a homogeneous solution. This intermiscible solvent acts to maintain the correct hydrophilic-lyophilic ratio necessary to produce transparency in the final lotion. The intermiscible solvent found highly suitable for the purpose of the present invention is oleic acid. Sufficient oleic acid should be incorporated into the composition to give the final product a pH of 5.0 to 6.0, which is the optimum pH range to maintain stability in the pyrethrins.

The resulting mixture with water must be emulsified. A highly suitable emulsifying agent which is easily available and which works very satisfactorily is mono-iso-octyl-phenyl-poly-oxyethylene-glycol-ether having the formula

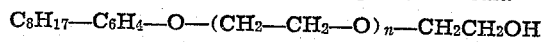

and especially one in which $n$ ranges from five to fifteen. This product in commercial form would contain varying moles of ethylene oxide groups with an average of approximately nine moles and is commercially available under the name of "Triton X-100" from Rohm & Haas Co. or under the name "Igepal CA-710" from the General Dyestuff Corp. (Antara Division, N. Y.). The latter manufacturer also calls the same product "Antarox A-201" or "Igepal HC extra high conc."

The sesamin extract may contain in total from 11 to 25% of sesamin solids. The sesamin solids desirably contain an average of 90% of pure sesamin.

The apiol (dimethyl methylene ether of allyl tetroxy-benzene) which is employed is desirably oleoresin of parsley fruit (liquid apiol). Apiol in this form has the advantage of not crystallizing out of the lotion. However, as far as certain aspects of the invention are concerned, crystalline apiol may be employed, although for lotion purposes, it is not as desirable as liquid apiol. The apiol can be dissolved in the pyrethrum extract since the latter contains kerosene as a dissolving medium, in which apiol is also soluble.

Dinitroanisole is employed as an ovicide to destroy the nits or eggs of the parasites. Benzyl alcohol is used as a solvent for the dinitroanisole. This alcohol also has a slight anesthetic effect which is desirable. Benzyl alcohol is also desirable for use as a solvent for the dinitroanisole, because a suspension of pure sesamin crystals in sesame oil was found soluble in benzyl alcohol.

The odor of the lotion may be improved by using a mixture of essential oils.

In addition to the ingredients specified, butyl stearate is used in the formulation as part of the oily phase, to create the right balance between the oily and watery phases of the emulsion. In addition, butyl stearate has a certain emollient effect on the skin and scalp which is desirable from a therapeutic point of view.

The following example is an illustration of a formulation in accordance with the present invention, but is not to be construed as limiting the invention:

| | Per cent w./w. |
|---|---|
| 2,4-dinitroanisole | 1.00 |
| Sesamin extract | 0.25 |
| Benzyl alcohol | 8.00 |
| Pyrethrum extract (containing 1.075% pyrethrins) | 10.75 |
| Apiol (oleoresin parsley) | 0.50 |
| Perfume oil | 0.90 |
| Oleic acid | 2.00 |

Butyl stearate _____ 3.00
Mono - iso - octyl - phenyl - nonyloxyethylene-glycol-ether _____ 27.00
Distilled water _____ 46.60

A procedure which may be employed for making a batch of the lotion in accordance with the formulation set forth above, is as follows:

Step #1.—The dinitroanisole, sesamin extract and benzyl alcohol are mixed together until dissolved. The solution is filtered and kept for Step #2.

Step #2.—The pyrethrum extract, apiol and perfume oil are placed in a stainless steel container, the solution from Step #1 is added, and the mixture is stirred until uniform. At this point the mixture will be cloudy.

Step #3.—The oleic acid and butyl stearate are added and the mixture stirred for twenty minutes. At this point, the mixture should be sparkling clear.

Step #4.—The mono-iso-octyl-phenyl-polyethylene-glycol-ether is added. At this point, the mixture will be cloudy.

Step #5.—The distilled water is added slowly with constant stirring, whereupon the mixture will be sparkling clear.

A pyrethrum lotion as described is thoroughly efficient and quickly effective in combating body and head lice, even in the most severe cases, is stabilized against decomposition, and remains clear and homogeneous indefinitely at temperatures above 15° C. When this lotion is applied, the lice die quickly. These applications are attended without dermatitis or skin irritation. The parasiticidal action of the lotion is decisive, and nits contacted with this lotion are killed and fail to incubate.

In the application of the lotion, one or two ounces of this lotion, applied, as for example, to the infected head of a person, is allowed to remain for about ten to fifteen minutes. At the end of that period, the medication may be removed with water, or if desired, soap and water may be used. It was found by this medication process, that the lice were killed, and that the nits did not incubate at the end of the hatching period.

Because the lotion is produced without application of heat, the pyrethrins, which may be easily destroyed when exposed to temperatures above 50° C., is not affected adversely during manufacture of the lotion.

Since the lotion of the present invention is clear and homogeneous, it is not necessary to shake it before use. In the case of a suspension which has to be shaken before use, there is no assurance that the active ingredients will be applied to the affected part in the right proportions. Furthermore, with a suspension, there are solid particles which are not easy to wash off. The lotion of the present invention, on the other hand, contains detergents which serve to produce foam so that the lotion works like a shampoo. A great deal of foam is produced in its application, and this carries all foreign matter out of the hair. In other words, the emulsifying agents serve not only to afford a clear lotion, but also permit said lotion with all the foreign matter attached thereto to be washed off. This is important where hair is being treated.

While the invention has been described with particular reference to a specific embodiment, it is to be understood that it is not to be limited thereto but is to be construed broadly and restricted solely by the scope of the appended claims.

What is claimed is:

1. A parasiticidal lotion for body parasites containing pyrethrum extract, sesamin extract, apiol, dinitroanisole, benzyl alcohol, oleic acid as an intermiscible solvent for said ingredients, water and a mono-iso-octyl-phenyl-polyoxyethylene-glycol-ether having the formula $$C_8H_{17}-C_6H_4-O-(CH_2-CH_2-O)_n-CH_2CH_2OH$$

as an emulsifying agent to form a clear, stable, homogeneous lotion.

2. A parasiticidal lotion as described in claim 1, wherein $n$ in the formula of the emulsifying agent ranges from five to fifteen.

3. A parasiticidal lotion as described in claim 1, wherein $n$ in the formula of the emulsifying agent has an approximate average of nine.

4. A parasiticidal lotion as described in claim 2, comprising butyl stearate.

ALLEN L. OMOHUNDRO.
FRANZ M. NEUMEIER.

References Cited in the file of this patent

UNITED STATES PATENTS

| Number | Name | Date |
|---|---|---|
| 451,508 | McGillvroy | May 5, 1891 |
| 1,514,377 | Dow | Nov. 4, 1924 |
| 1,940,646 | Grant | Dec. 19, 1933 |
| 2,202,145 | Eagleson | May 28, 1940 |
| 2,347,265 | Hyman | Apr. 25, 1944 |
| 2,410,101 | Park | Oct. 29, 1946 |
| 2,432,607 | Brown | Dec. 6, 1947 |

FOREIGN PATENTS

| Number | Country | Date |
|---|---|---|
| 572,310 | Great Britain | Oct. 2, 1945 |
| 660,982 | France | July 19, 1929 |

OTHER REFERENCES

Goodman, Cosmetic Dermatology, page 10, McGraw-Hill Book Company, 1936, New York.

Hager, Handbuch der Pharmazeutischen Praxis, volume II, page 400, 1927, J. Springer Company.

Eddy, NRC Insect Control Committee Report No. 143, November 21, 1945; Committee on Medical Research OSRD, section 1 (OEM cmr 4331), pages 1, 9, 10, 15 and 16.

Drug and Cosmetic Industry, January 1943, page 93.